3,085,977
FLUID LOSS RETARDER FOR CLEAR WATER DRILLING FLUIDS

Arthur Park and James W. Spurlock, Tulsa, Okla., assignors to Pan American Petroleum Corporation, Tulsa, Okla., a corporation of Delaware
No Drawing. Filed Oct. 21, 1959, Ser. No. 847,691
12 Claims. (Cl. 252—8.5)

The present invention is concerned with fluids used in well-working operations such as, for example, drilling operations. More particularly, it relates to low solids or clear water drilling compositions.

A drilling completion or work-over fluid should have a low fluid loss to avoid the build-up of a thick mud filter pack on the wall of the hole and to minimize flushing of a production zone. If a low density fluid can be used, clear water has the advantages of faster penetration rates, greater footage per bit and lower cost. Moreover, a clear completion or work-over fluid results in a faster and cleaner repair job than does mud.

In using drilling fluids of this type, however, fluid loss frequently is too high. Keeping water in the system and preventing it from leaking into the formation is essential to reducing caving and sloughing of water-sensitive shales, etc. In cases of high fluid loss, it is difficult to circulate the well and to circulate sand and cuttings from it. Also, with high fluid loss there is occasionally the danger of getting tools stuck.

Accordingly, it is an object of our invention to provide a novel aqueous, low fluid loss, low solids composition having the advantages of clear water in drilling operations. It is another object of our invention to supply a fluid loss reducer in clear water and similar drilling fluids which is unaffected by alkaline earth metal ions or other ions, such as sodium and iron. Another object of our invention is to employ resin emulsions as a fluid loss retarder for clear water drilling fluids. It is a further object of our invention to supply a fluid loss retarder that will remain in the system after the latter has been treated with a floculating agent.

We have now discovered that a clear water or low solids drilling fluid having the above desirable properties can be prepared, with certain modifications, by incorporating in the fluid a significant amount of known natural or synthetic resin emulsion. By "significant" we mean enough emulsion to produce a practical reduction in fluid loss, e.g., a loss of not more than about 30 to 35 cc. in thirty minutes as determined by the Standard Field Procedure for Testing Drilling Fluids, IV A.P.I. Test RP 29, 1950. Typically, we desire to employ these emulsions in a concentration ranging from about 1 to about 15 pounds per barrel, and preferably from about 4 to about 7 pounds per barrel. Additional surface active materials should be added to render the resulting system stable when subjected to drilling conditions. We have found that when a resin emulsion, in the form currently available, is added to a sample of clear water drilling fluid, the emulsion can become diluted to such an extent that the effect of the original surfactant is reduced to the point that coagulation of the resin or a breakdown of the emulsion occurs. To overcome this difficulty, a surface active agent of the type disclosed herein should be added in an amount sufficient to render the resin stable in the aqueous system. This can be determined by simple experiment. Emulsions having anionic surfactants are undesirable because they are not stable under drilling conditions ordinarily encountered. Accordingly, the nonionic and cationic surfactants are required to render our new fluids stable to ionic contamination and other conditions known to cause emulsions to break. Generally, the particle size of the resin in these emulsions is found to range from about 0.05 to about 1.5 microns.

Initially, when fresh fluid is used, the fluid loss is rather high until a sufficient concentration of relatively fine solids resulting from the drilling operation appear in the fluid. While we do not desire to be liimted to any theory in the explanation of this phenomenon, it is believed that these solids are laid down around or over the openings through which fluid is lost. The resulting layer serves as a foundation or mat on which the finer resin particles can then be deposited to form a substantially liquid impervious skin. Accordingly, when drilling with clear water is started, it is desirable to add, along with the resin emulsion, a small amount, such as from about 0.5 to about 15 pounds per barrel of a finely divided, e.g., 100 to 300 mesh material such as silica flour, ground limestone, ground shale or clay, etc.

Another factor in obtaining a satisfactory drilling fluid is concerned with its stability to high speed agitation. Frequently, when subjected to high speed mixing, such as that provided by present day high-speed blenders, the emulsion will break. Accordingly, any emulsion that can be broken by such preliminary high-speed mixing should be stabilized before actual use in the drilling fluid by the addition of a surface active agent. Sometimes stability can be imparted to the emulsion merely by adding a different resin emulsion to it.

In addition to being of the nonionic or cationic variety surfactant, the latter preferably should be a non-foamer. This is because those surfactants which foam tend to be kept away from the resin particles and hence, cannot wet or coat them properly to result in a stable emulsion. Suitable surfactants for our emulsion are those that either coat the resin particles in a more or less permanent manner, or which remain in solution in a condition so that they are readily contacted by said particles. Thus, in the present description and claims where reference is made to a surfactant or to a surface active agent, it is to be strictly understood that we not only mean a nonionic or cationic agent, but we also desire these terms to exclude such agents that are primarily foamers. Suitable nonionic surface active agents that may be used in accordance with our invention are nonylphenoxy polyoxyethylene ethano, long chain fatty acid esters containing multiple ether linkages, sorbitan monolaurate, alkyl phenol esters, oxyethylated lauryl alcohol, oxyethylated tridecyl alcohol, polyoxyethylene lauric amido amine, long chain fatty acid esters of multiple complex amine linkages, and the like. Examples of cationic surfactants used in preparing our stabilized drilling fluids are alkyl dimethyl carboxymethyl ammonium chloride, alkyl dimethyl hydroxyethyl ammonium chloride, octdecyl dimethyl benzyl ammonium chloride, lauric alkyl amide, and the like.

These surface active agents are added to the emulsion in stabilizing amounts; a concentration that can readily be determined by simple experiment. Normally, we may use such materials in a concentration of from about 5 to about 40 weight percent, based on the weight of the emulsion, and preferably from about 10 to 20 weight percent, same basis.

As examples of natural resins that may be employed in preparing the emulsions used in our invention, there may be mentioned the following natural materials: Dammar, Kauri, Copal, Amber, Mastic, Sandarac, natural rubber latex, rosin, and the like. Synthetic resins which may be employed in preparing the emulsions used in our invention are polymeric compounds prepared from monomers, such as vinyl acetate, vinyl stearate, ethyl acrylate, decyl acrylate, dimethyl maleate, butadiene, styrene, acrylonitrile, acrylic acid, vinyl chloride, vinylidene chloride, and the like. As examples of copolymers that may be used, there may be mentioned resins prepared from isoprene and butadiene, styrene and butadiene, vinyl chloride and butadiene, cumarone and indene, vinyl acetate and methyl methacrylate, vinyl acetate and vinyl stearate, vinyl acetate and acrylic acid and butadiene and acrylonitrile. Other resins from which suitable emulsions can be prepared are ter-polymers of styrene, butadiene and vinyl pyridine; butadiene, acrylonitrile and methacrylic acid; styrene, butadiene and methacrylic acid, etc. Emulsions of alkyd resins may also be used. In the case of emulsions prepared from copolymers and ter-polymers, the quantity of each component has not been found to be too critical. Thus, for example, copolymer components may range from about 30/70 to 70/30. A typical composition of ter-polymers useful in preparing our new drilling fluids is a resin containing 11.5 percent styrene, 16 percent vinyl pyridine, and 72.5 percent butadiene.

The expression "resin emulsion," as used in the present description and claims, is intended to refer only to aqueous dispersions or emulsions prepared from resins of the type mentioned above and rendered stable to drilling conditions in the manner described herein.

Generally, these emulsions may vary in solids content from about 30 to about 70 percent, preferably from about 40 to about 60 percent, and have a density of from about 8 to about 10 pounds per gallon. Such emulsions prepared from either natural or synthetic resins are normally incorporated into the drilling fluid in concentration of from about 1 to about 15 pounds per barrel.

Our invention will be further illustrated by reference to the tables which follow. In the first table, the ability of the different resin emulsions designated to reduce fluid loss is shown as determined by the Standard Field Procedure for Testing Drilling Fluids, IV A.P.I. Test RP 29, 1950.

In another series of tests, resin emulsions having the compositions indicated were forced through 8.5 by 10-inch sandstone cores under a pressure of 100 p.s.i. Reduction in flow rates through the core ranged from about 91 to about 99 percent, as shown below.

*Table II*

| Resin | lbs./bbl. of Water | Flow of Water Through Core, cc./sec. | Fluid Loss of Emulsion, cc./sec. | Percent Reduction of Flow |
|---|---|---|---|---|
| Styrene-Butadiene | 5.0 | 11.9 | 0.280 | 98.9 |
| Silica Flour | 2.0 | | | |
| Styrene-Butadiene | 5.0 | 2.35 | 0.20 | 91.1 |
| Silica Flour | 2.0 | | | |
| Granular Polystyrene (20-100 Mesh) | 0.5 | | | |
| Styrene-Butadiene | 5.0 | 6.58 | 0.24 | 96.2 |
| Silica Flour | 2.0 | | | |
| Arquad 16 [1] | 0.5 | | | |
| Vinyl Acetate-Vinyl Stearate | 5.0 | 28.57 | 0.103 | 99.6 |
| Silica Flour | 2.0 | | | |

[1] N-alkyl trimethyl ammonium chloride derived from palm oil acids.

The data appearing in Table III show the effect of a resin filter cake on the reverse flow of water through a sandstone core. All tests were performed at 100 p.s.i. As will be seen, the emulsions tested reduced flow into the core (fluid loss) about 99 percent. After the core was subjected to a particular emulsion under the conditions indicated, it was reversed, water was run through the core and the flow rate measured. In all tests this rate returned to 85 percent of the original value, which indicates that the reduction in fluid loss by the use of the emulsion is at or near the formation surface so that very little penetration of the resin into the formation occurs. Thus, the permeability of the formation is not impaired by the use of these emulsions as fluid loss retarders in accordance with our invention.

*Table I*

| Emulsion | Total Solids, Weights Percent | pH | Resin, lbs./gal. | API Fluid Loss on Water Containing 5 lb./bbl. Emulsion, cc./30 min. | API Fluid Loss on Water Containing 5 lb./bbl. Emulsion, 2 lb./bbl. Silica Flour, 0.5 lb./bbl. nonyl phenoxy polyoxyethylene ethanol, cc./30 min. |
|---|---|---|---|---|---|
| Butadiene (33%)-Styrene (67%) | 48 | 10.5 | 8.4 | 350 | 24 |
| Vinyl Acetate | 55 | 3.5–5.5 | 9.2 | 84 | 20.5 |
| Vinyl Acetate-Acrylic | 55–57 | | 9.1 | 67 | 22.5 |
| Vinyl Acetate-Vinyl Stearate | 51–53 | | 9.0 | 50 | 19 |
| Styrene (11%)-Butadiene (73%)-Vinyl Pyridine (16%) | 41 | 11.0 | | 77.5 | 28 |
| Styrene-Butadiene-Methacrylic Acid | 39 | 8.0 | | 85 | 27 |
| Butadiene (66%)-Acrylonitrile (34%) | 40 | 10.0 | | 210 | 27 |
| Vinyl Chloride-Vinylidene Chloride | 50 | 8.0 | 10.0 | | 22.5 |

*Table III*

| Resin Emulsion Added | lbs./bbl. Water | Flow of Water Through Core, cc./sec. | Backflow of Water Through Core, cc./sec. | Fluid Loss of Resin Emulsion, cc./sec. | Reduction of Flow, Percent | Backflow of Water After Treatment, cc./sec. | Recovery, Percent |
|---|---|---|---|---|---|---|---|
| Vinyl Stearate-Vinyl Acetate | 5.0 | 7.14 | 7.14 | 0.0016 | 99 | 6.09 | 85.1 |
| Silica Flour | 2.0 | | | | | | |
| Stabilizer [1] | 0.35 | | | | | | |
| Butadiene-Acrylonitrile | 5.0 | 8.06 | 7.80 | 0.0011 | 99 | 7.14 | 91.2 |
| Silica Flour | 2.0 | | | | | | |
| Stabilizer [1] | 0.35 | | | | | | |
| Styrene-Butadiene | 5.0 | 8.06 | 8.34 | 0.0028 | 99 | 8.06 | 97.2 |
| Silica Flour | 2.0 | | | | | | |
| Stabilizer [1] | 0.35 | | | | | | |

[1] Nonyl phenoxy polyoxyethylene ethanol.

The next table shows the results of fluid loss tests using various resin emulsion muds and 6 percent bentonite mud. These tests were made by placing a sandstone biscuit, about 2 inches by ⅜-inch, in a steel cylinder. A gasket was placed about the edges of the biscuit and secured to the cylinder in a manner such that fluid could only flow through the sandstone. Touching the top side of the biscuit was a revolving scraper which turned during the test at 45 r.p.m. The mud being tested flowed through a pipe in the top of the cylinder and over the scraper elements on to the sandstone. The pressure employed in all cases was 100 p.s.i.

Table IV

| Resin Emulsion Added | Water, lbs./bbl. | A.P.I. Fluid Loss of Mud, cc./30 min. | Flow Rate of Water Through Core, cc./sec. | Fluid Loss Through Core Filter Cake Constantly removed, cc./30 min. | Rate of Fluid Loss, cc./min. |
|---|---|---|---|---|---|
| Styrene-Butadiene | 5.0 | 80 | 0.302 | 49.8 | 1.30 |
| Silica Flour | 2.0 | | | | |
| Stabilizer [1] | 0.5 | | | | |
| Butadiene-Acrylonitrile | 5.0 | 17.8 | 0.263 | 32.8 | 0.685 |
| Silica Flour | 2.0 | | | | |
| Stabilizer [1] | 0.5 | | | | |
| Vinyl Acetate | 5.0 | 11.8 | 0.281 | 18.1 | 0.345 |
| Silica Flour | 2.0 | | | | |
| Stabilizer [1] | 0.5 | | | | |
| 6% Bentonite | | 12.0 | 0.328 | 20.5 | 0.570 |

[1] Nonyl phenoxyethylene ethanol.

In drilling rate tests comparing clear water, to which these emulsions had been added, with clear water by itself and with a 6 percent bentonite mud, it was found that the drilling rate with muds containing the resin emulsions was about 2 percent slower than with clear water. However, drilling rates with 6 percent bentonite mud were from 10 to 15 percent slower than those obtained with the emulsion muds of our invention. These figures hold true for both sandstone and limestone.

Additional tests were carried out to determine the effect of shale solids on the emulsion muds used in accordance with our invention. This property is important, of course, because in actual use high concentrations of shale build up in the mud and must be removed if a satisfactory mud system is to be maintained. To remove such materials from mud, flocculating agents are frequently used. As examples of suitable flocculating agents there may be mentioned a product sold under the trademark Separan, a polyacrylamide with about 10 percent of the amide groups hydrolyzed; guar gum; a copolymer of the vinyl acetate and maleic acid, etc. While shale can be readily removed from such muds by current flocculation techniques, it is often difficult to take out the shale without destroying the desired properties of the mud. This is particularly true if an anionic surfactant has been used to prepare the emulsion because these surfactants are attracted to the oppositely charged shale solids, resulting in a breakdown of the emulsion. Under such conditions, the resin is lost and fluid loss increases. This emphasizes the importance of the use of nonionic and cationic surfactants in preparing stable fluids containing these emulsions for use as described herein.

In a particular test, a clear water drilling fluid was prepared having the following composition:
4 pounds per barrel Polyvinyl Acetate
1 pound per barrel Styrene-Butadiene
2 pounds per barrel Silica Flour
0.5 pound per barrel a long chain fatty acid ester of multiple complex amine linkages
0.5 pound per barrel Higher Alkyl Phenoxy Polyoxyethylene Ethanol This mixture also contained a flocculating agent, such as Separan, in a concentration of about 0.005 weight percent. To this fluid, over 30 minute intervals, shale was added in the amounts indicated below. The fluid loss measurements were made on the deflocculated fluid in accordance with the A.P.I. test referred to above.

Table V

| Amount of Shale Added, lbs./bbl. | A.P.I. Fluid Loss of Mud After Flocculation of Solids, cc./30 min. |
|---|---|
| 0 (initial) | 12 |
| 14 | 7.5 |
| 28 | 7.0 |
| 42 | 8.0 |

In carrying out the above tests, there was no noticeable change in mud viscosity before the addition of shale and after flocculation of the solids. The fluid loss of the mud decreased after the first addition and flocculation of the shale. The mixture of emulsion and surface active agents shown above is also stable to the contamination of alkaline earth metals, such as calcium and other metal ions, such as iron and sodium.

It will be appreciated by those skilled in the art that we have provided a novel drilling fluid having all the advantages of clear water, together with the added desirable property of low fluid loss. Still another desirable feature of such fluids is the fact that they function as very satisfactory lubricants for the drill bit. Also, frictional drag of mud against the formation and against the drill pipe is reduced because of the thin layer of resin laid down on the surfaces of the pipe and formation. A further advantage realized when using the drilling fluids of our invention is that corrosion is reduced since the resin particles tend to deposit on the oppositely charged metal surfaces, thereby stopping current flow.

While use of our novel composition lies primarily in the field of drilling fluids, it will be apparent that they may be used to advantage in a number of other ways. For example, they may be used to consolidate loose sands in open sections of a well. Also, they may be used to repair split or pierced casing by depositing these compositions in the form of a layer of substantial thickness over the damaged area. Other uses of these emulsions, prepared and stabilized in accordance with our invention include their incorporation into cement slurries to produce cements of reduced fluid loss characteristics.

It is to be realized that we make no claim to the resin emulsions themselves. These materials are commercially available. Our invention resides primarily in the concept of employing emulsions of the above-mentioned type as a lost circulation retarder in clear water drilling fluids, and in the adaptation of these emulsions to the conditions encountered in the drilling of wells. The adaptation of these emulsions into a stable drilling fluid is accomplished by the use of the proper surfactant, i.e., a nonionic or cationic surfactant.

We claim:
1. A clear water drilling fluid stable to ions of the alkaline earth metals, sodium and iron, and in which the other essential and active ingredients, in addition to water, consist essentially of from about 1 to about 15 pounds per barrel of an aqueous resin emulsion as a lost circulation retarder stabilized with from about 5 to about 40 percent by weight of a surface-active agent, based upon the weight of said emulsion, said agent being selected from the group consisting of nonionic and cationic surface-active agents other than those that are primarily foamers.

2. The drilling fluid of claim 1 in which the resin emulsion is present in a concentration of from about 4 to about 7 pounds per barrel.

3. The clear water drilling fluid of claim 1 in which the resin employed in the emulsion is prepared from a copolymer of styrene and butadiene.

4. The clear water drilling fluid of claim 1 in which the resin employed in the emulsion is prepared from a polymer of vinyl acetate.

5. The clear water drilling fluid of claim 1 in which the resin employed in the emulsion is prepared from a copolymer of butadiene and acrylonitrile.

6. The clear water drilling fluid of claim 1 in which the resin employed in the emulsion is prepared from a copolymer of vinyl acetate and vinyl stearate.

7. The clear water drilling fluid of claim 1 in which the resin employed in the emulsion is prepared from a copolymer of vinyl chloride and vinylidene chloride.

8. The clear water drilling fluid of claim 1 in which the material employed to stabilize the fluid is a cationic surface active agent.

9. The clear water drilling fluid of claim 1 in which the material employed to stabilize the fluid is a nonionic surface active agent.

10. The drilling fluid of claim 9 in which the surface active agent is a polyoxyethylene derivative.

11. In a method of drilling a well in which the drilling fluid employed consists essentially of clear water and where substantial volumes of fluid are lost to the formation penetrated by said well, the improvement which comprises adding to said fluid an aqueous resin emulsion in a concentration of from about 1 to about 15 pounds per barrel of said fluid, said emulsion containing a surface active agent in a concentration of from about 5 to about 40 weight percent, based on the weight of said emulsion, said agent being selected from the group consisting of nonionic and cationic surface-active agents other than those that are primarily foamers.

12. The method of claim 11 in which the surface active agent is employed in a concentration of from about 10 to about 20 weight percent.

References Cited in the file of this patent

UNITED STATES PATENTS

| | | |
|---|---|---|
| 2,473,929 | Wilson | June 21, 1949 |
| 2,597,872 | Iler | May 27, 1952 |
| 2,718,497 | Oldham et al. | Sept. 20, 1955 |
| 2,751,368 | Yost et al. | June 19, 1956 |
| 2,775,557 | Morgan | Dec. 25, 1956 |
| 2,805,990 | Bergman | Sept. 10, 1957 |

OTHER REFERENCES

Mallory: How Low Solid Muds Can Cut Drilling Costs, article in the Petroleum Engineer, April 1957, pages B21, B22, B23 and B24.